I. E. & J. A. OVERPECK.
Cane-Stripper.

No. 62,876.

Patented Mar. 12, 1867

Witnesses.
Sallie E Peck
A L Peck

Inventor.
J E Overpeck
J A Overpeck
By their Atty
H K Peck

United States Patent Office.

ISAAC E. AND JOHN A. OVERPECK, OF OVERPECK'S STATION, OHIO.

Letters Patent No. 62,876, dated March 12, 1867.

IMPROVEMENT IN CANE STRIPPER.

*The Schedule referred to in these Letters Patent and making part of the same.*

TO ALL WHOM IT MAY CONCERN:

Be it known that we, ISAAC E. OVERPECK and JOHN A. OVERPECK, of Overpeck's Station, in Butler county, in the State of Ohio, have invented certain new and useful Improvements in Sorghum Strippers; and we do hereby declare that the following is a full and exact description thereof, reference being had to the accompanying drawings, and to the letters of reference marked thereon.

Our improved sorghum stripper is so constructed as to be capable of seizing the top of a stalk, cutting it off, and drawing the end of the stalk within a stripping ring or aperture which is forced down around the stalk, causing the leaves or blades to be quickly stripped off, and finally, by a drawing action, the stalk is cut off from its stump near the ground.

Figure 1:
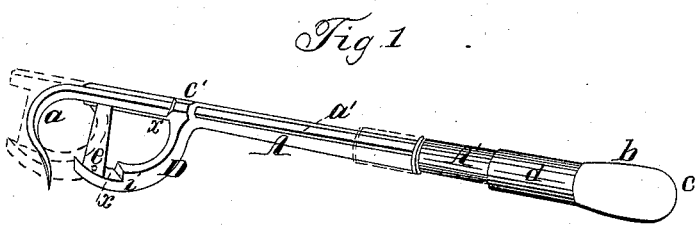
Figure 1 is a perspective view of our invention.

In the accompanying drawings, $a$ indicates a hook, which is formed at the end of a metal bar or rod, $a'$. The bar $a'$ extends through the handle $b$, and is secured therein by the nut $c$ at the end of handle $b$. The bar $a'$, of which the hook $a$ is an extension, is encased in the sheath A and A', as repsesented in the drawings. That part of the sheath A' which is cylindrical fits into a ferrule, $d$, attached to handle $b$, and that portion of the sheath marked A covers three sides of the bar $a'$, and is secured upon it by the connecting piece $c'$. A curved arm D, which is attached to sheath A, is provided with a double-edged knife, $e$, which extends across from the upper end of arm D to the sheath A, and is rigidly fastened at both ends, where it connects with the arm and the sheath. A portion of the arm D and a portion of the sheath A (which is above the point of connection of the arm D with the sheath) is cut away at $x$ $x$, as seen at fig. 1, which makes these parts flush with the flush edges of the knife $e$. The body of the hook $a$ is widened for the purpose of retaining its hold upon the end of the stalk after it is cut off at the top.

Figure 2:
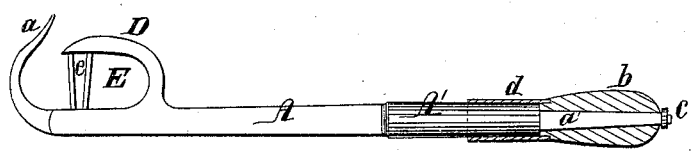
Figure 2 represents the reverse side from that seen in fig. 1, and a sectional view of the handle.

The stripper may be used in the following manner: The handle is grasped with one hand, and the sheath, at A', is held with the other, the stripper being in position as represented in fig. 2. The top of the sorghum stalk is caught with the hook $a$, when the handle $b$ is firmly held while the sheath A A' is shoved upwards with the left hand of the operator, which will cause the knife $e$ to cut off the top of the stalk which is between it and the hook $a$. As the knife is cutting off the stalk the hook $a$ is forcing the end of it below the knife edge and into the aperture formed by the knife and arm D. The next movement is to force the stalk through the aperture E, by bearing or pushing the stripper down towards the root of the stalk, which will effectually divest the stalk of all its blades. This being done, the operator seizes the sheath at A', in his right hand and the stalk in his left hand, when, by drawing the instrument towards him, the lower edge of the knife will sever the stalk, and its stump will at the same time cause the hook, with the handle $b$, to be drawn back to the position represented in fig. 2, and ready for a second operation. The dotted lines in fig. 1 represent the relative position of the hook $a$ and knife $e$ after the top of the stalk is cut off and at the beginning of the operation of stripping off the leaves. We have found our improved stripper to operate well with the aperture E made a little larger than the circumference of the largest sorghum stalks. When the sheath A A' is thrust upwards upon the hook-bar $a'$ to the position as represented in the dotted lines in fig. 1, the projecting end of the hook $a$ will strike against the inclined shoulder $i$ of the arm D and stop the further movement of the shield in that direction. But, in cutting off the but of the stalk, the hook $a$, with its bar $a'$ and handle $b$, will be easily forced back to their first position by the stump, which will bear against the flattened hook during the cutting action of the knife.

Having fully described our improvement in sorghum strippers, what we claim, and desire to secure by Letters Patent, is—

1. The double-edged knife $e$, arranged and operating in combination with hook $a$, for cutting and stripping stalks, substantially as and for the purpose described.

2. The handle $b$ $d$ and shield A A', in combination with a hook and knife, arranged substantially as specified for the purpose set forth.

In testimony whereof we have hereunto set our hands this 5th day of January, 1867.

<div style="text-align:right">I. E. OVERPECK,<br>J. A. OVERPECK.</div>

Witnesses:
   H. P. K. PECK.
   GEORGE JACOBY.